(12) United States Patent
Hayashi (10) Patent No.: US 11,063,526 B2
(45) Date of Patent: Jul. 13, 2021

(54) POWER CONVERSION EQUIPMENT

(71) Applicant: KABUSHIKI KAISHA TOSHIBA, Minato-ku (JP)

(72) Inventor: Yusuke Hayashi, Yokohama (JP)

(73) Assignee: KABUSHIKI KAISHA TOSHIBA, Minato-ku (JP)

( * ) Notice: Subject to any disclaimer, the term of this patent is extended or adjusted under 35 U.S.C. 154(b) by 31 days.

(21) Appl. No.: 16/564,348

(22) Filed: Sep. 9, 2019

(65) Prior Publication Data

US 2020/0127576 A1   Apr. 23, 2020

(30) Foreign Application Priority Data

Oct. 22, 2018 (JP) .............................. JP2018-198717

(51) Int. Cl.
*H02M 7/217* (2006.01)
*H02M 1/00* (2006.01)

(52) U.S. Cl.
CPC ...... *H02M 7/217* (2013.01); *H02M 2001/007* (2013.01); *H02M 2001/0058* (2013.01); *H02M 2001/0074* (2013.01)

(58) Field of Classification Search
CPC ... H02M 2001/0058; H02M 2001/007; H02M 2001/0074; H02M 3/335–3/3378; H02M 5/293; H02M 7/12; H02M 7/21; H02M 7/217–7/725
See application file for complete search history.

(56) References Cited

U.S. PATENT DOCUMENTS

| 7,558,087 | B2 | 7/2009 | Meysenc et al. |
| 9,374,016 | B2 | 6/2016 | Yamada |
| 9,584,034 | B2 | 2/2017 | Deboy |
| 9,742,272 | B2 | 8/2017 | Yamada |
| 9,819,272 | B2 * | 11/2017 | Perreault ........... H02M 3/33523 |
| 9,973,099 | B2 * | 5/2018 | Ye ..................... H02M 3/33576 |
| 10,243,480 | B2 | 3/2019 | Fujita |

(Continued)

FOREIGN PATENT DOCUMENTS

| JP | 2012-217319 A | 11/2012 |
| JP | 2016-27779 A | 2/2016 |

(Continued)

OTHER PUBLICATIONS

Matthias Kasper, et al. "Hardware Verification of a Hyper-Efficient (98%) and Super-Compact (2.2kW/dm$^3$) Isolated AC/DC Telecom Power Supply Module based on Mullti-Cell Converter Approach", IEEE, 2015, pp. 65-71.

*Primary Examiner* — Fred E Finch, III
(74) *Attorney, Agent, or Firm* — Oblon, McClelland, Maier & Neustadt, L.L.P.

(57) ABSTRACT

Power conversion equipment has a first input terminal and a second input terminal to which an AC input voltage is applied, a plurality of AC-DC converters which are series-connected between the first input terminal and the second input terminal and each of which converts a divided input voltage obtained by dividing the input voltage into a full-wave rectified voltage in a state of being insulated electrically, and a first output terminal and a second output terminal through which the full-wave rectified voltages converted by the plurality of AC-DC converters are output commonly.

14 Claims, 10 Drawing Sheets

(56) References Cited

U.S. PATENT DOCUMENTS

| | | | |
|---|---|---|---|
| 2008/0198637 A1 | 8/2008 | Meysenc et al. | |
| 2013/0063981 A1* | 3/2013 | Dujic | H02M 7/219 |
| | | | 363/16 |
| 2014/0049990 A1* | 2/2014 | Limpaecher | H02M 3/33584 |
| | | | 363/15 |
| 2015/0295497 A1* | 10/2015 | Perreault | H02M 3/33507 |
| | | | 363/21.03 |
| 2016/0261205 A1* | 9/2016 | Kolar | H02M 1/32 |
| 2016/0301305 A1 | 10/2016 | Yamada | |
| 2020/0076311 A1* | 3/2020 | Bortis | H02M 7/217 |

FOREIGN PATENT DOCUMENTS

| | | |
|---|---|---|
| JP | 2016-59271 A | 4/2016 |
| JP | 2016-111850 A | 6/2016 |
| JP | 2017-77114 A | 4/2017 |
| JP | 2018-64436 A | 4/2018 |

\* cited by examiner

POWER CONVERSION EQUIPMENT

CROSS REFERENCE TO RELATED APPLICATIONS

This application is based upon and claims the benefit of priority from the prior Japanese Patent Application No. 2018-198717, filed on Oct. 22, 2018, the entire contents of which are incorporated herein by reference.

FIELD

Embodiments of the present disclosure relate to power conversion equipment.

BACKGROUND

Power conversion equipment such as an AC-DC converter and a DC-DC converter is proposed which performs a power conversion by applying an input voltage to a multi-cell circuit in which a plurality of cell circuits are connected in series. In this kind of power conversion equipment, generally, a slave controller which controls an output voltage or an output current of each cell circuit is provided in each of the cell circuits, and a master controller is provided which stabilizes the operation of all the cell circuits in the multi-cell circuit. The master controller needs to control each cell circuit in cooperation with each slave controller, and thus the control becomes complicated. In addition, when the master controller is provided, the number of components increases, and further a wiring for connecting the master controller and all the cell circuits is required so as to increase the number of wirings. Thus, power consumption is increased, and miniaturization also becomes difficult.

DETAILED DESCRIPTION

According to one embodiment, power conversion equipment has a first input terminal and a second input terminal to which an AC input voltage is applied, a plurality of AC-DC converters which are series-connected between the first input terminal and the second input terminal and each of which converts a divided input voltage obtained by dividing the input voltage into a full-wave rectified voltage in a state of being insulated electrically, and a first output terminal and a second output terminal through which the full-wave rectified voltages converted by the plurality of AC-DC converters are output commonly.

Hereinafter, embodiments of the present disclosure will be described with reference to the drawings. In the following embodiments, the description will be given mainly about characteristic configurations and operations in power conversion equipment. However, the power conversion equipment may include configurations and operations omitted in the descriptions below.

First Embodiment

Figure 1:
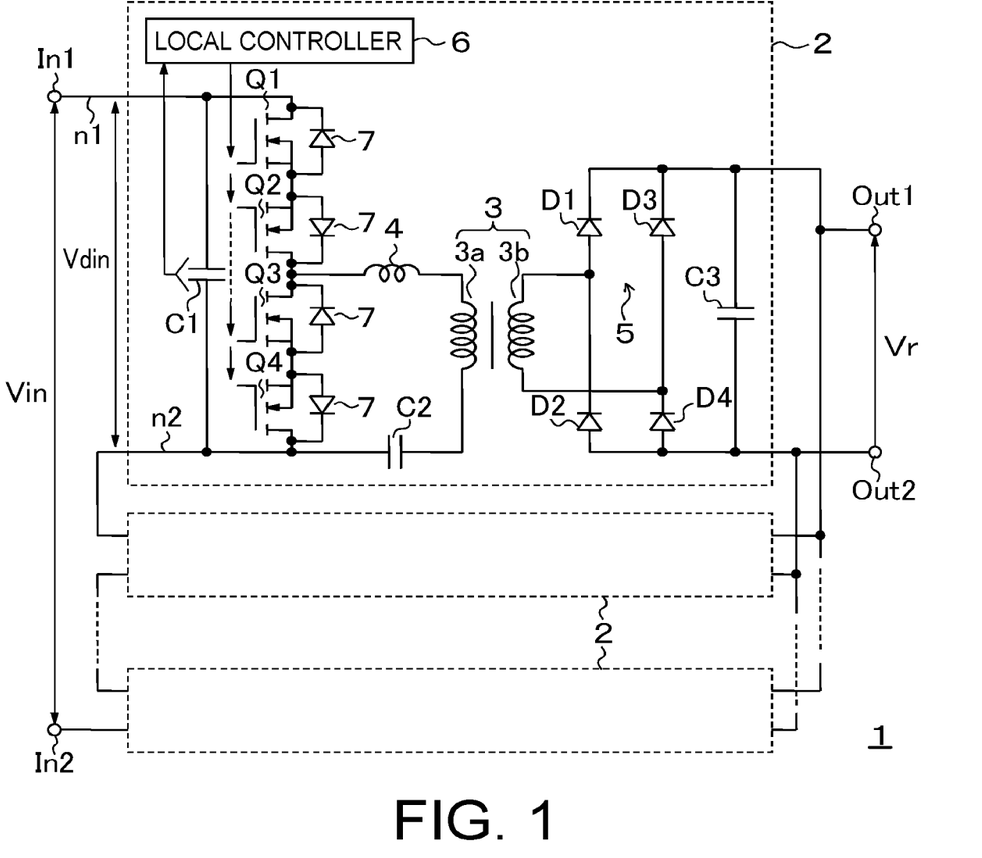
FIG. 1 is a circuit diagram of power conversion equipment according to a first embodiment.

FIG. 1 is a circuit diagram of power conversion equipment 1 of a first embodiment. The power conversion equipment 1 of FIG. 1 includes a first input terminal In1 and a second input terminal In2, a plurality of AC-DC converters 2, and a first output terminal Out1 and a second output terminal Out2.

An AC input voltage Vin is applied to a first input terminal In1 and a second input terminal In2. More specifically, with the voltage of one of the first input terminal In1 and the second input terminal In2 as a reference, the input voltage Vin is applied to the other. For example, one of the first input terminal In1 and the second input terminal In2 is set as a ground potential as a reference.

Figure 2A:
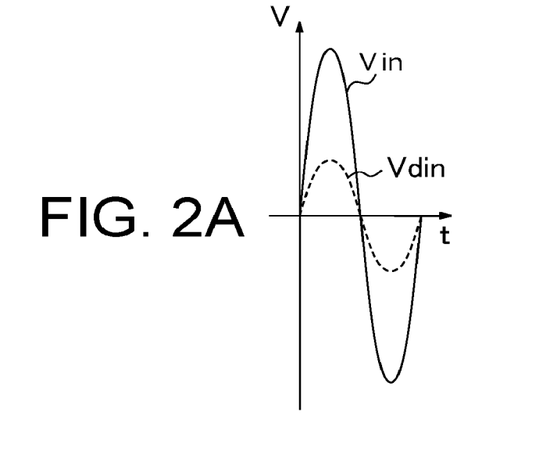
FIG. 2A is a view illustrating a voltage waveform of an input voltage and a divided input voltage.
Figure 2B:
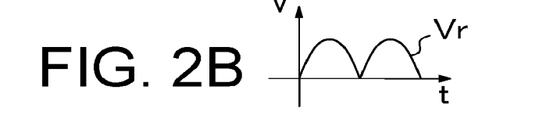
FIG. 2B is a view illustrating a voltage waveform of a full-wave rectified voltage.

Respective input terminals of a plurality of AC-DC converters 2 are series-connected between the first input terminal In1 and the second input terminal In2. For this reason, a divided input voltage Vdin obtained by dividing the input voltage Vin is applied to each AC-DC converter 2. In the state of being insulated electrically, the AC-DC converter 2 converts the divided input voltage Vdin into a full-wave rectified voltage Vr (Vr=K×|Vdin|, K is a fixed number depending on the circuit configuration or the connection number of the AC-DC converter 2, the winding ratio of a transformer 3 configuring the AC-DC converter 2, and the like). The full-wave rectified voltage Vr converted by each AC-DC converter 2 is output from the common first output terminal Out1 and second output terminal Out2. That is, the respective output terminals of the plurality of AC-DC converters 2 are connected in parallel with the first output terminal Out1 and the second output terminal Out2. FIG. 2A illustrates a voltage waveform of the input voltage Vin and the divided input voltage Vdin, and FIG. 2B illustrates a voltage waveform of the full-wave rectified voltage Vr. The input voltage Vin and the divided input voltage Vdin have the same frequency. The full-wave rectified voltage Vr mainly has a DC component and two times of the frequency of the input voltage Vin and the divided input voltage Vdin.

In this way, the power conversion equipment 1 of FIG. 1 includes a plurality of AC-DC converters 2 which have parallel outputs and a serial input. The plurality of AC-DC converters 2 configure a multi-cell circuit, and each AC-DC converter 2 configures a cell circuit. The number of connection stages of the AC-DC converters 2 in the power conversion equipment 1 is not limited. The number of the connection stages of the AC-DC converters 2 may be determined by taking into consideration the voltage amplitude of the input voltage Vin, the breakdown voltage of the switching element in the AC-DC converter 2, or the like.

The voltage amplitude of the input voltage Vin and the voltage amplitude of the full-wave rectified voltage Vr are not particularly limited. For example, a commercial AC voltage of 100 V or 200 V may be set as the input voltage Vin. The full-wave rectified voltage Vr can be also set to an optional voltage amplitude by changing the voltage conversion ratio of the AC-DC converter 2.

The internal configuration of each AC-DC converter 2 is not limited particularly. However, the internal configuration of the AC-DC converter 2 of FIG. 1 is described as one example. Each AC-DC converter 2 of FIG. 1 includes a first capacitor C1, first to fourth transistors Q1 to Q4, a transformer 3, an inductor 4, a second capacitor C2, a diode bridge circuit 5, a third capacitor C3, and a local controller (control circuit) 6.

The first to fourth transistors Q1 to Q4 are cascode-connected between a first node n1 and a second node n2 to which the divided input voltage Vdin is applied. For example, the first to fourth transistors Q1 to Q4 are n-type power MOSFETs. In each of the first to fourth transistors Q1 to Q4, a diode 7 is parallel-connected between a drain and a source. Gate voltages of the first to fourth transistors Q1 to Q4 are controlled by a local controller 6. The diode 7 may use a body diode of the power MOSFET.

One end of the inductor 4 is connected to the connection path of a second transistor Q2 and a third transistor Q3. The other end of the inductor 4 is connected to one end of a primary coil 3a of the transformer 3. One end of the second capacitor C2 is connected to the other end of the primary coil 3a of the transformer 3. The other end of the second capacitor C2 is connected to the second node n2.

The transformer 3 includes the primary coil 3a and a secondary coil 3b which are coupled magnetically in the state of being insulated electrically. Thus, a primary circuit from the first node n1 and the second node n2 to the primary coil 3a and a secondary circuit from the secondary coil 3b to the first output terminal Out1 and the second output terminal Out2 are insulated electrically. The diode bridge circuit 5 including first to fourth diode D1 to D4 is connected to the secondary coil 3b of the transformer 3. An output end of the diode bridge circuit 5 is connected to the first output terminal Out1 and the second output terminal Out2. In addition, the third capacitor C3 is connected between the first output terminal Out1 and the second output terminal Out2.

The local controller 6 turns on or off the first to fourth transistors Q1 to Q4 according to the polarity of the divided input voltage Vdin. More specifically, in a case where the divided input voltage Vdin has a positive polarity, the local controller 6 always turns on the second transistor Q2 and the fourth transistor Q4 and performs a switching operation of repeatedly turning on and off the first transistor Q1 and the third transistor Q3 at a constant duty ratio (for example, 0.5) and complementarily. In addition, in a case where the divided input voltage Vdin has a negative polarity, the local controller 6 always turns on the first transistor Q1 and the third transistor Q3 and performs a switching operation of repeatedly turning on and off the second transistor Q2 and the fourth transistor Q4 at a constant duty ratio (for example, 0.5) and complementarily. The local controller 6 is used to turn on or off the first to fourth transistors Q1 to Q4 of the AC-DC converter 2 to which the local controller 6 is connected, and it is not necessary to synchronize with the local controller connected to another AC-DC converter 2 and to exchange the information.

In the power conversion equipment 1 according to the present embodiment, each AC-DC converter 2 includes the local controller 6 but does not include a master controller which overall controls the plurality of AC-DC converters 2. This is because the plurality of AC-DC converters 2 connected in series have a property that performs automatically an operation of balancing the input voltage and the output current of each AC-DC converter 2 even without performing the overall control in a case where the first to fourth transistors Q1 to Q4 are turned on/off at a constant duty ratio, and the input/output voltage of the AC-DC converter 2 has a full-wave rectified waveform or becomes Vr=K×|Vdin|. If the master controller is provided to overall control each AC-DC converter 2 as in the related art, each slave controller necessarily changes the control as a result, and further an operation that the master controller changes the control again is repeated. Thus, the control becomes complicated, and the operation of each AC-DC converter 2 becomes unstable, which is a concern.

In each local controller 6 in the present embodiment, only a simple control is performed which switches between on and off of the first to fourth transistors Q1 to Q4 at a constant duty ratio depending on whether the input voltage Vdin has a positive polarity or a negative polarity. Any additional controls are not performed such as a control of changing the duty ratio such that a voltage or a current follows a certain command value. Accordingly, the input voltage and the output current of each of the AC-DC converters 2 connected in series are balanced automatically, and as a result, the operation of each AC-DC converter 2 is stabilized. In addition, it is possible to match the voltage amplitudes, the frequencies, and the phases of the full-wave rectified voltages Vr output from the AC-DC converters 2.

Figure 3A:
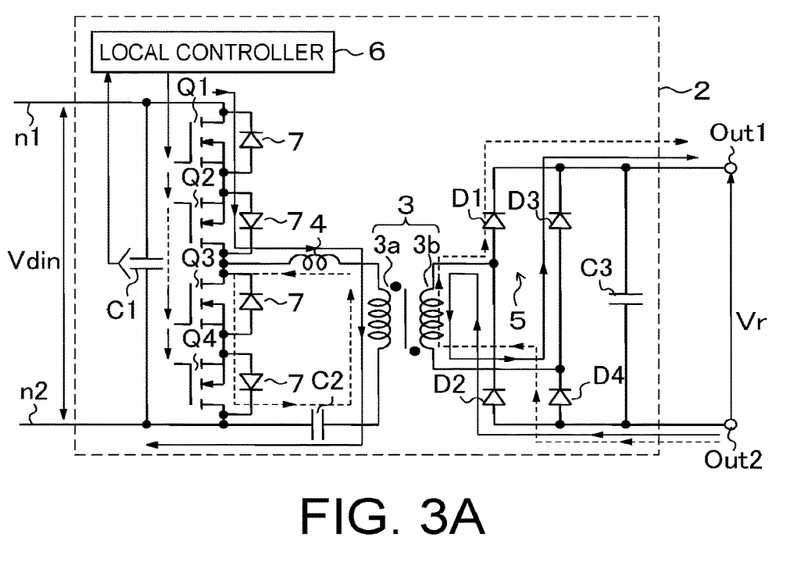
FIG. 3A is a view in which a direction of a current flowing in each AC-DC converter is indicated by an arrow in a case where a divided input voltage has a positive polarity.
Figure 3B:
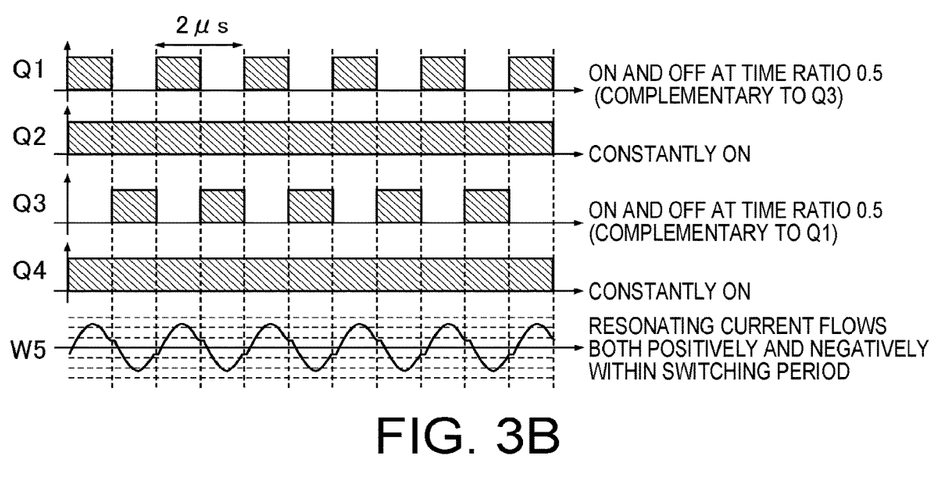
FIG. 3B is a waveform diagram illustrating on/off timings of first to fourth transistors and a current waveform of an inductor 4 in each AC-DC converter in a case where the divided input voltage has a positive polarity.

FIG. 3A is a view in which the direction of the current flowing in each AC-DC converter 2 is indicated by an arrow in a case where the divided input voltage Vdin has a positive polarity, and FIG. 3B is a waveform diagram illustrating the on/off timing of the first to fourth transistors Q1 to Q4 and a current waveform w5 of a resonance circuit in each AC-DC converter 2 in a case where the divided input voltage Vdin has a positive polarity. FIG. 3B illustrates a waveform diagram within a period of about 11 µs in a case where a switching frequency of the first to fourth transistors Q1 to Q4 is set to 500 kHz. However, a waveform diagram of FIG. 3B continues during a period (for example, for 10 ms when the frequency of the divided input voltage Vdin is 50 Hz) in which the divided input voltage Vdin is positive.

In a case where the divided input voltage Vdin has a positive polarity, the local controller 6 performs a switching operation that always turns on the second transistor Q2 and the fourth transistor Q4 and repeatedly turns on and off the first transistor Q1 and the third transistor Q3 at a constant duty ratio (a duty ratio is equal to or more than 0 and equal to or less than 0.5, for example, 0.5) and complementarily. Thus, as illustrated in FIG. 3A, in a case where the first transistor Q1 is turned on, a current flows in a direction of the first node n1→the drain-source of the first transistor Q1→the source-drain of the second transistor Q2 and the diodes 7 connected in parallel→the inductor 4→a DC output circuit including the primary coil 3a and the secondary coil 3b of the transformer 3, the diode bridge 5, and the third capacitor C3→the second capacitor C2→the second node n2. In a case where the third transistor Q3 is turned on, a current flows in a direction of the inductor 4→the third transistor Q3→the source-drain of the fourth transistor Q4 and the diode 7→the second capacitor C2→the DC output circuit including the primary coil 3a and the secondary coil 3b of the transformer 3, the diode bridge 5, and the third capacitor C3. In addition, in a state where the first transistor Q1 and the third transistor Q3 are each turned on, a resonance circuit is configured to include the inductor 4 and the second capacitor C2. In the resonance circuit, a current flows which resonates at a resonance frequency determined by the inductance of the inductor 4 and the capacity of the second capacitor C2. At the timing when the polarity of the current resonating at the resonance frequency is inverted, the switching operation of the first transistor Q1 and the third transistor Q3 is performed, or the inductance of the inductor 4 and the capacity of the second capacitor C2 are determined for matching with the switching frequency of the first transistor Q1 and the third transistor Q3. The inductance of the inductor 4 and the capacity of the second capacitor C2 are adjusted such that the resonance frequency becomes a frequency faster than the frequency of the input voltage Vin.

In FIG. 3A, a current path in a case where the divided input voltage Vdin has a positive polarity, the first transistor Q1 is turned on, and the third transistor Q3 is turned off is indicated by a solid-line arrow, and a current path in a case where the divided input voltage Vdin has a positive polarity, the first transistor Q1 is turned off, and the third transistor Q3 is turned on is indicated by a broken-line arrow. As illustrated in the drawing, when the first transistor Q1 and the third transistor Q3 are complementarily turned on/off, the direction of the current flowing through the resonance circuit including the inductor 4 and the second capacitor C2 is changed, and thus the direction of the current flowing through the secondary coil 3b of the transformer 3 is changed. However, since the diode bridge circuit 5 is provided, the polarity of the output voltage Vr of the AC-DC converter 2 is not changed.

When the primary coil 3a and the secondary coil 3b of the transformer 3 have reverse winding directions, in a case where the voltage applied to between the drain terminal of the third transistor Q3 and the drain terminal of the fourth transistor Q4 is positive, an induced current is generated in a direction of a second diode D2→the secondary coil 3b→a third diode D3. In a case where the voltage applied to between the drain terminal of the third transistor Q3 and the drain terminal of the fourth transistor Q4 is zero, an induced current is generated in a direction of the fourth diode D4→the secondary coil 3b→the first diode D1.

Figure 4:
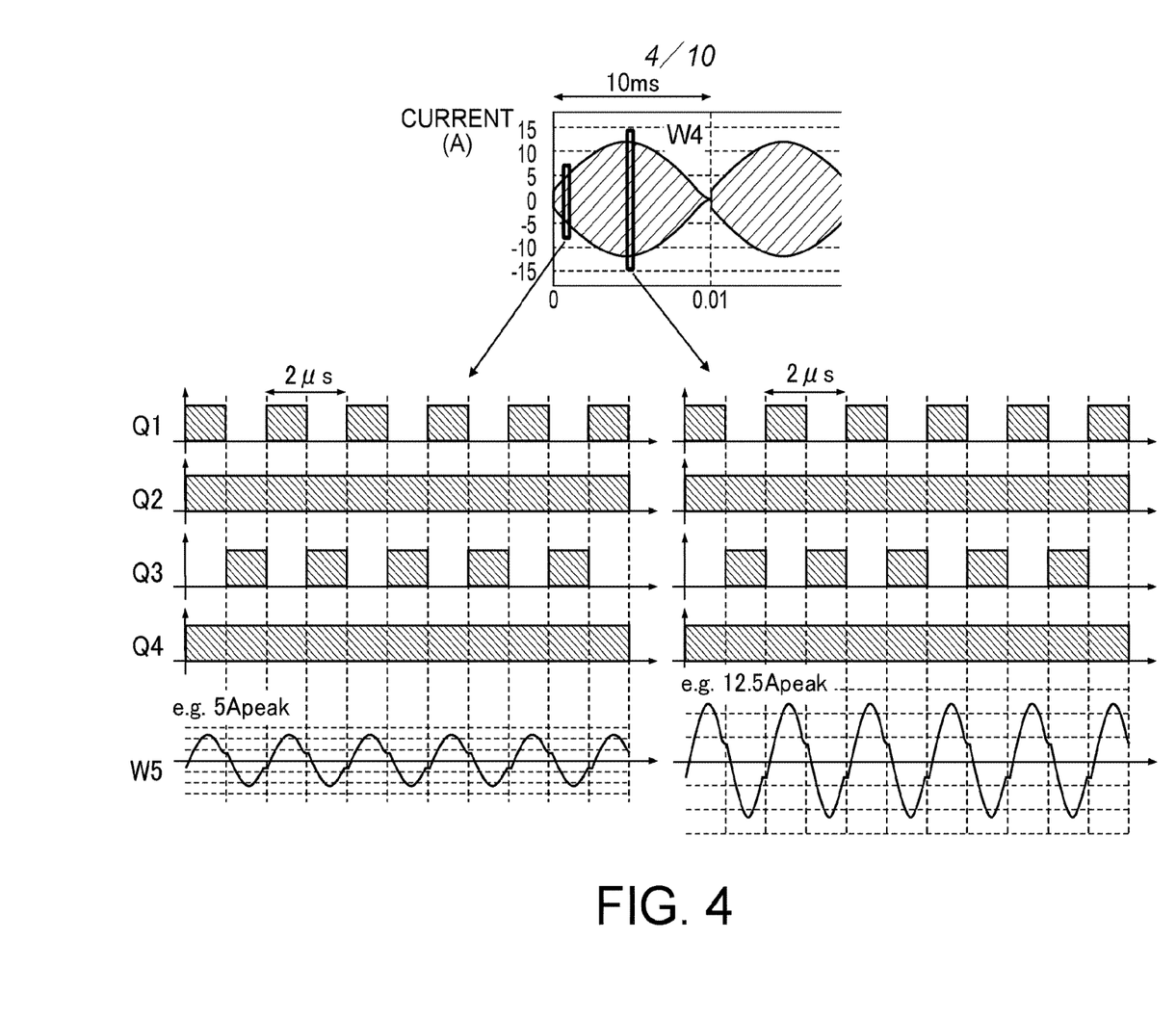
FIG. 4 is a waveform diagram illustrating an aspect in which the current waveform w5 of the inductor 4 in each AC-DC converter in a case where the divided input voltage has a positive polarity is changed.

FIG. 4 is a waveform diagram illustrating an aspect in which the current waveform w5 of the inductor 4 in each AC-DC converter 2 in a case where the divided input voltage Vdin has a positive polarity is changed. As illustrated in FIG. 4, while the divided input voltage Vdin has a positive polarity, a resonance current having an amplitude proportional to the amplitude of the divided input voltage Vdin flows through the inductor 4 by complementarily turning on/off the first transistor Q1 and the third transistor Q3 at a constant duty ratio.

Figure 5A:
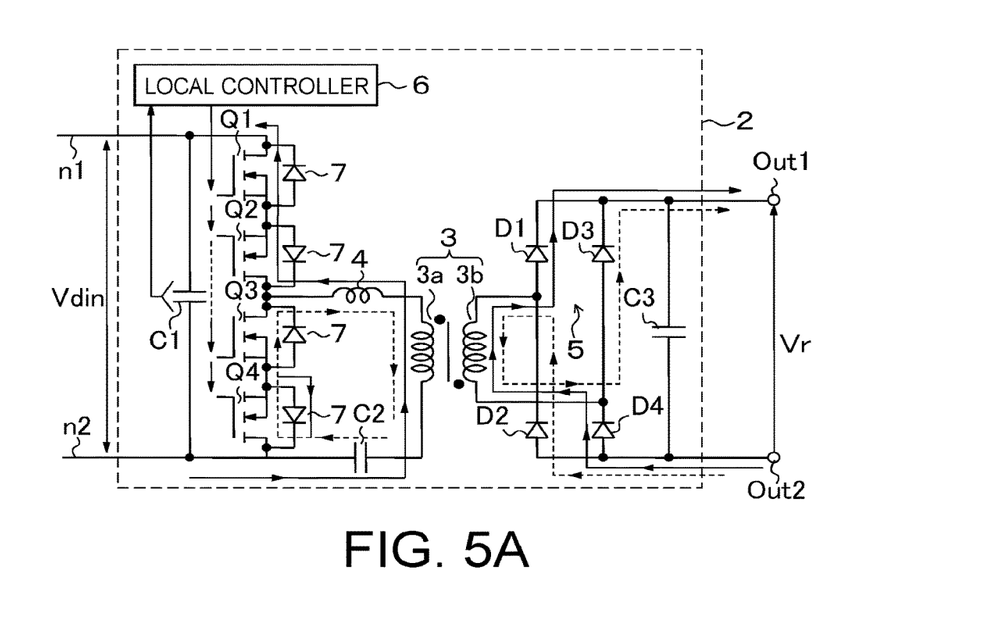
FIG. 5A is a view in which a direction of a current flowing in each AC-DC converter 2 is indicated by an arrow in a case where the divided input voltage is a negative polarity.
Figure 5B:
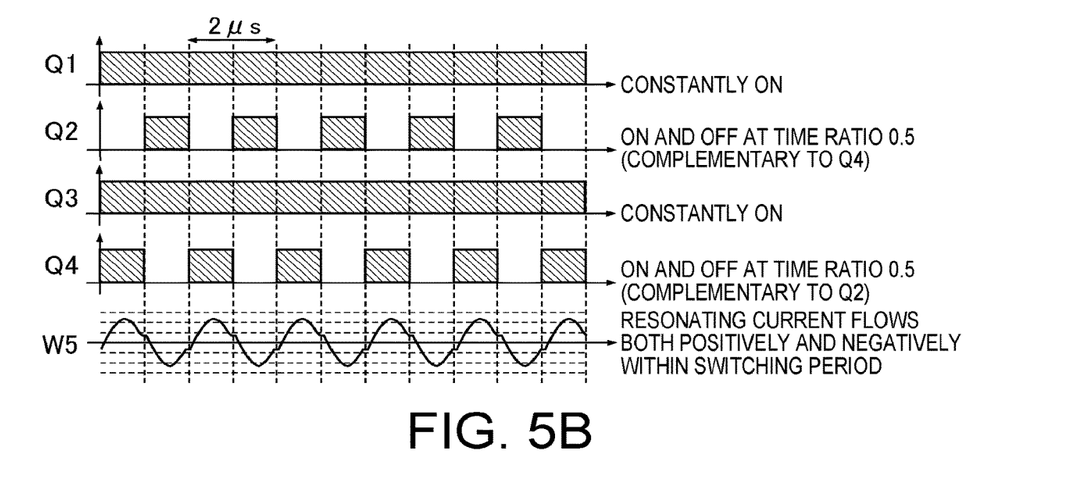
FIG. 5B is a view illustrating on/off timings of the first to fourth transistors and a current waveform of the inductor 4 in each AC-DC converter in a case where the divided input voltage has a negative polarity.

FIG. 5A is a view in which the direction of the current flowing in each AC-DC converter 2 is indicated by an arrow in a case where the divided input voltage Vdin has a negative polarity, and FIG. 5B is a view illustrating the on/off timing of the first to fourth transistors Q1 to Q4 and the current waveform w5 of the resonance circuit in each AC-DC converter 2 in a case where the divided input voltage Vdin has a negative polarity. FIG. 5B illustrates a waveform diagram within a period of about 11 µs in a case where a switching frequency of the first to fourth transistors Q1 to Q4 is set to 500 kHz. However, a waveform diagram of FIG. 5B continues during a period (for example, for 10 ms when the frequency of the divided input voltage Vdin is 50 Hz) in which the divided input voltage Vdin is negative. In a case where the divided input voltage Vdin has a negative polarity, the local controller 6 performs a switching operation that always turns on the first transistor Q1 and the third transistor Q3 as illustrated in FIG. 5A and repeatedly turns on and off the second transistor Q2 and the fourth transistor Q4 at a constant duty ratio (for example, 0.5) and complementarily. Thus, as illustrated in FIG. 5B, in a case where the second transistor Q2 is turned on, a current flows in a direction of the second node n2→the second capacitor C2→the DC output circuit including the primary coil 3a and the secondary coil 3b of the transformer 3, the diode bridge 5, and the third capacitor C3→the inductor 4→the drain-source of the second transistor Q2→the source-drain of the first transistor Q1 and the diode 7 connected in parallel between the drain-source of the first transistor Q1→the first node n1. In a case where the fourth transistor Q4 is turned on, a current flows in a direction of the inductor 4→the DC output circuit including the primary coil 3a and the secondary coil 3b of the transformer 3, the diode bridge 5, and the third capacitor C3→the second capacitor C2→the fourth transistor Q4→the source-drain of the third transistor Q3 and the diode 7 connected between the drain-source of the third transistor Q3. In addition, in a state where the second transistor Q2 and the fourth transistor Q4 are each turned on, a resonance circuit is configured to include the second capacitor C2 and the inductor 4. In the resonance circuit, a current flows which resonates at a resonance frequency determined by the inductance of the inductor 4 and the capacity of the second capacitor C2.

In FIG. 5A, a current path in a case where the divided input voltage Vdin has a negative polarity, the second transistor Q2 is turned on, and the fourth transistor Q4 is turned off is indicated by a solid-line arrow, and a current path in a case where the divided input voltage Vdin has a negative polarity, the second transistor Q2 is turned off, and the fourth transistor Q4 is turned on is indicated by a broken-line arrow. As illustrated in the drawing, when the first transistor Q1 and the third transistor Q3 are complementarily turned on/off, the direction of the current flowing through the resonance circuit including the inductor 4 and the second capacitor C2 is changed, and thus the direction of the current flowing through the secondary coil 3b of the transformer 3 is changed. However, since the diode bridge circuit 5 is provided, the polarity of the output voltage Vr of the AC-DC converter 2 is not changed.

Figure 6:
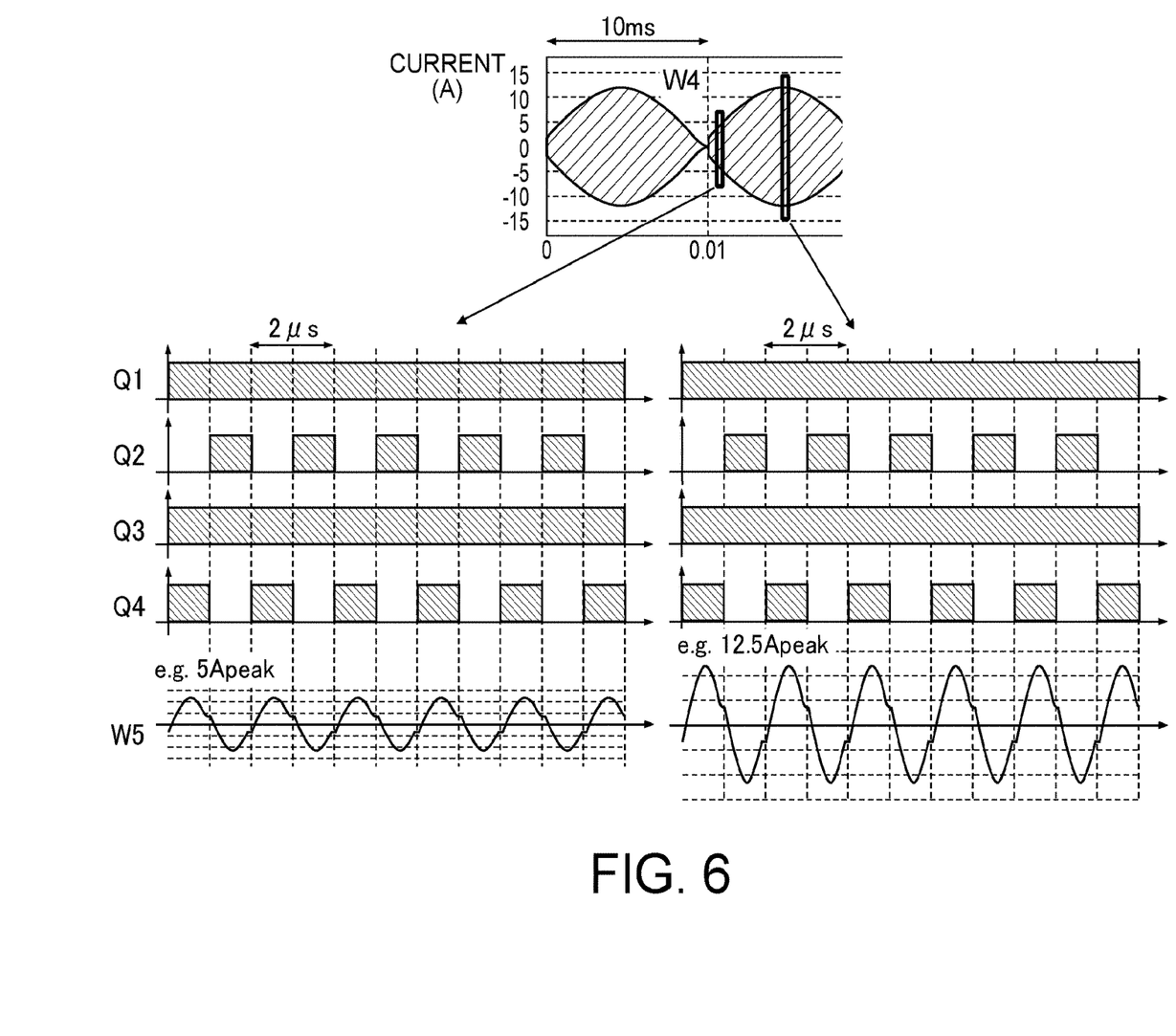
FIG. 6 is a waveform diagram illustrating an aspect in which a current waveform w5 of the inductor 4 in each AC-DC converter in a case where the divided input voltage has a negative polarity is changed.

FIG. 6 is a waveform diagram illustrating an aspect in which the current waveform w5 of the inductor 4 in each AC-DC converter 2 in a case where the divided input voltage Vdin has a negative polarity is changed. As illustrated in FIG. 6, while the divided input voltage Vdin has a negative polarity, a resonance current having an amplitude proportional to the amplitude of the divided input voltage Vdin flows through the inductor 4 by complementarily turning on/off the second transistor Q2 and the fourth transistor Q4 at a constant duty ratio.

Figure 7:
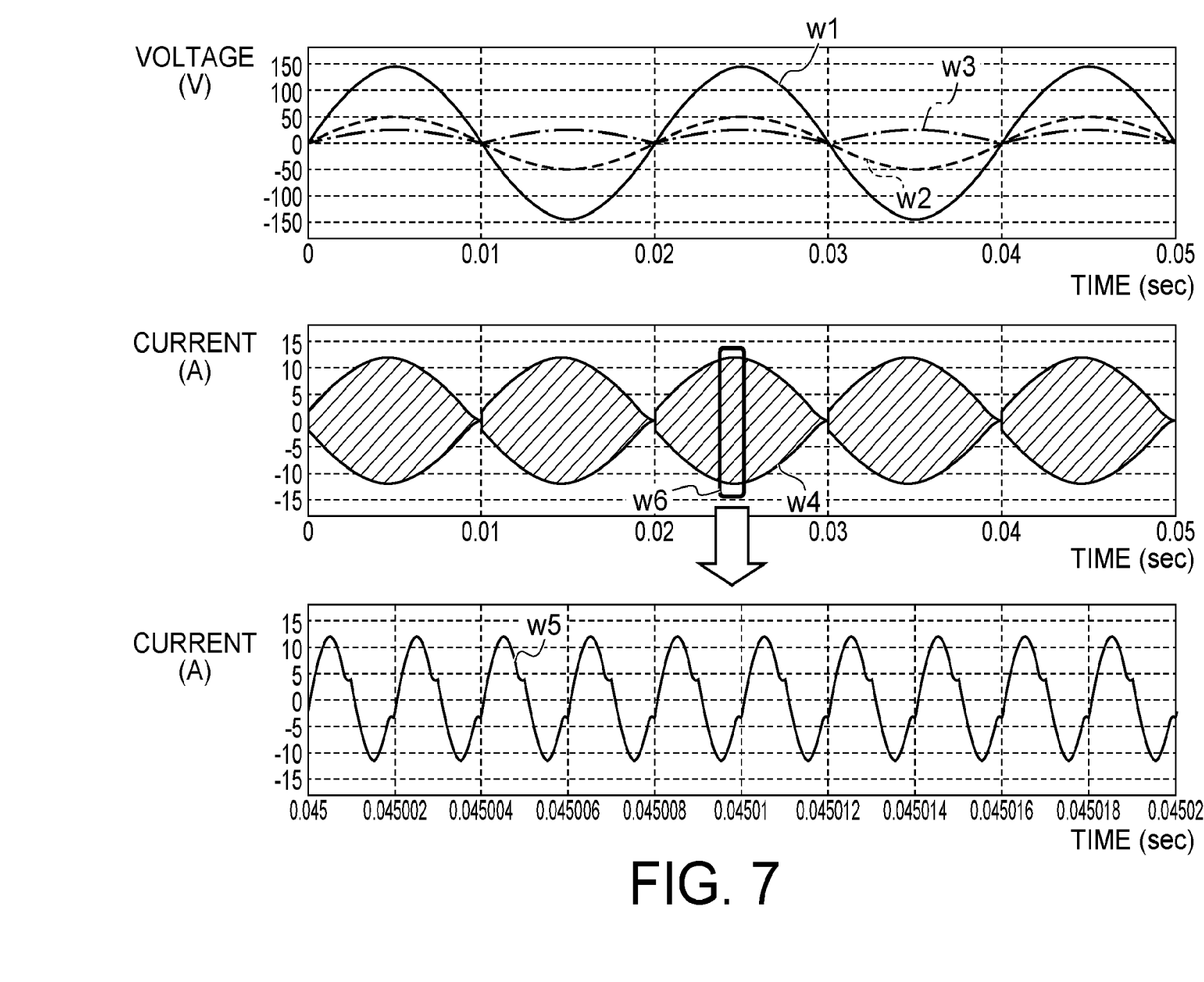
FIG. 7 is a waveform diagram illustrating a simulation result of the power conversion equipment of FIG. 1.

FIG. 7 is a waveform diagram illustrating a simulation result of the power conversion equipment 1 of FIG. 1. In the simulation of FIG. 7, an example is illustrated in which three AC-DC converters 2 are connected between the first input terminal In1 and the second input terminal In2.

A waveform w1 of FIG. 7 is a waveform of the input voltage Vin of AC 100 V at 50 Hz. A waveform w2 is a waveform of the divided input voltage Vdin applied to each AC-DC converter 2. A waveform w3 is a waveform of the full-wave rectified voltage Vr. A waveform w4 is a waveform of a current flowing through the resonance circuit in each AC-DC converter 2. The waveform w5 is a waveform obtained by enlarging an area within a frame w6 of the waveform w4 in a time-axis direction. As illustrated in the drawing, the resonance circuit performs a resonance operation at a resonance frequency (for example, about 500 kHz) much faster than the frequency of the input voltage Vin. The resonance frequency of the resonance circuit can be adjusted by the inductance of the inductor 4 and the capacity of the second capacitor C2.

As understood from the simulation result of FIG. 7, the power conversion equipment 1 of FIG. 1 outputs the full-wave rectified voltage Vr illustrated in the waveform w3 in synchronization with the frequency of the input voltage Vin illustrated in the waveform w1. The phase of the peak position of the full-wave rectified voltage Vr matches with the phase of the peak position of the input voltage Vin. In addition, the divided input voltage Vdin illustrated in the waveform w2 has the voltage amplitude of about one-third of the input voltage Vin. Further, the voltage amplitude of the full-wave rectified voltage Vr illustrated in the waveform w3 has about a half of the divided input voltage Vdin. This is because the voltage applied to the primary coil 3a of the transformer 3 through the second capacitor C2 is set to −Vdin/2 and +Vdin/2 while the voltage which first to fourth four transistors Q1 to Q4 connected in cascode output to between the connection node of the second transistor Q2 and the third transistor Q3 as a central point and the node n2 is Vdin and 0.

In the full-wave rectified voltage Vr which is output from the first output terminal Out1 and the second output terminal Out2 in the power conversion equipment 1 of FIG. 1, even-number higher harmonic wave of Vin is included in the DC voltage. Thus, various kinds of electric apparatuses cannot be driven which requires to receive the supply of the DC voltage which has a small higher harmonic wave and is an almost constant value. However, some electric apparatuses such as an incandescent lamp can be driven by the full-wave rectified voltage Vr.

Figure 2C:
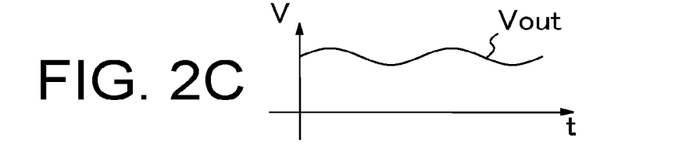
FIG. 2C is a view illustrating a voltage waveform of an output voltage of a DC-DC converter.
Figure 8:
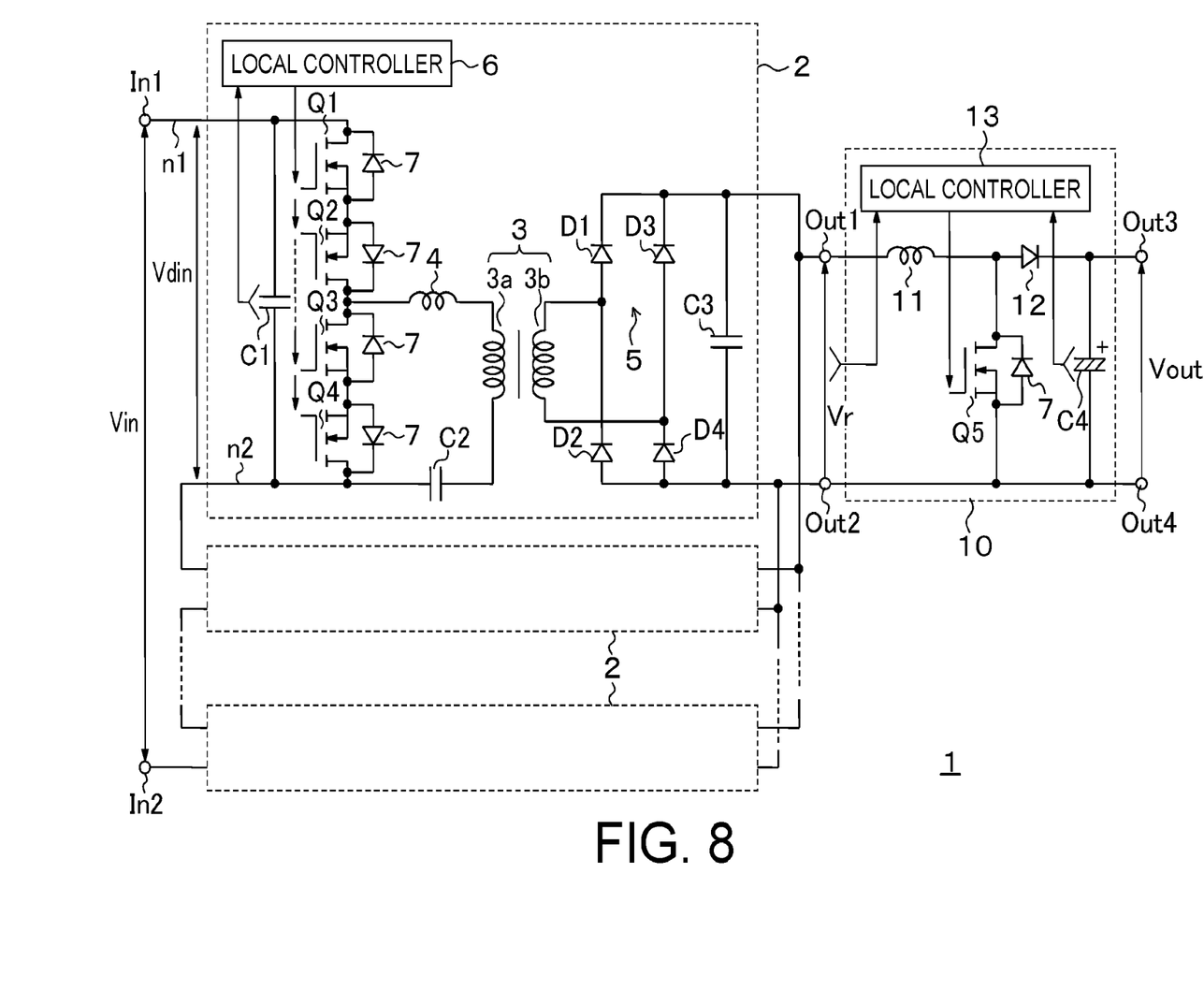
FIG. 8 is a view illustrating an example in which a DC-DC converter is connected to a first output terminal and a second output terminal in the power conversion equipment of FIG. 1.

FIG. 8 is a view illustrating an example in which the DC-DC converter 10 is connected to the first output terminal Out1 and the second output terminal Out2 in the power conversion equipment 1 of FIG. 1. The DC-DC converter 10 of FIG. 8 levels the voltage amplitude of the full-wave rectified voltage Vr to generate the DC voltage. In actual, as illustrated in FIG. 2C, in some cases, the output voltage Vout of the DC-DC converter 10 of FIG. 8 becomes a DC voltage slightly having a ripple component. The ripple component of the output voltage Vout can be reduced by enlarging a fourth capacitor C4.

The internal configuration of the DC-DC converter 10 is not limited particularly. However, the configuration of FIG. 8 is described as one example. The DC-DC converter 10 of FIG. 8 includes an inductor 11, a fifth transistor Q5, a diode 12, an electrolytic capacitor C4, and a local controller 13. One end of the inductor 11 is connected to the first output terminal Out1. The other end of the inductor 11 is connected to the anode of the diode 12 and the drain of the fifth transistor Q5. The source of the fifth transistor Q5 is connected to the second output terminal Out2. The cathode of the diode 12 is connected to the third output terminal Out3 and one end of the electrolytic capacitor C4. The other end of the electrolytic capacitor C4 is connected to the second output terminal Out2 and the fourth output terminal Out4. Incidentally, the capacitor without a polarity may be connected instead of the electrolytic capacitor C4.

The turning on/off of the fifth transistor Q5 is controlled by the local controller 13. The local controller 13 controls the gate voltage of the fifth transistor Q5 according to the output voltage Vr between the first output terminal Out1 and the second output terminal Out2 and the output voltage Vout of the DC-DC converter 10.

Figure 9:
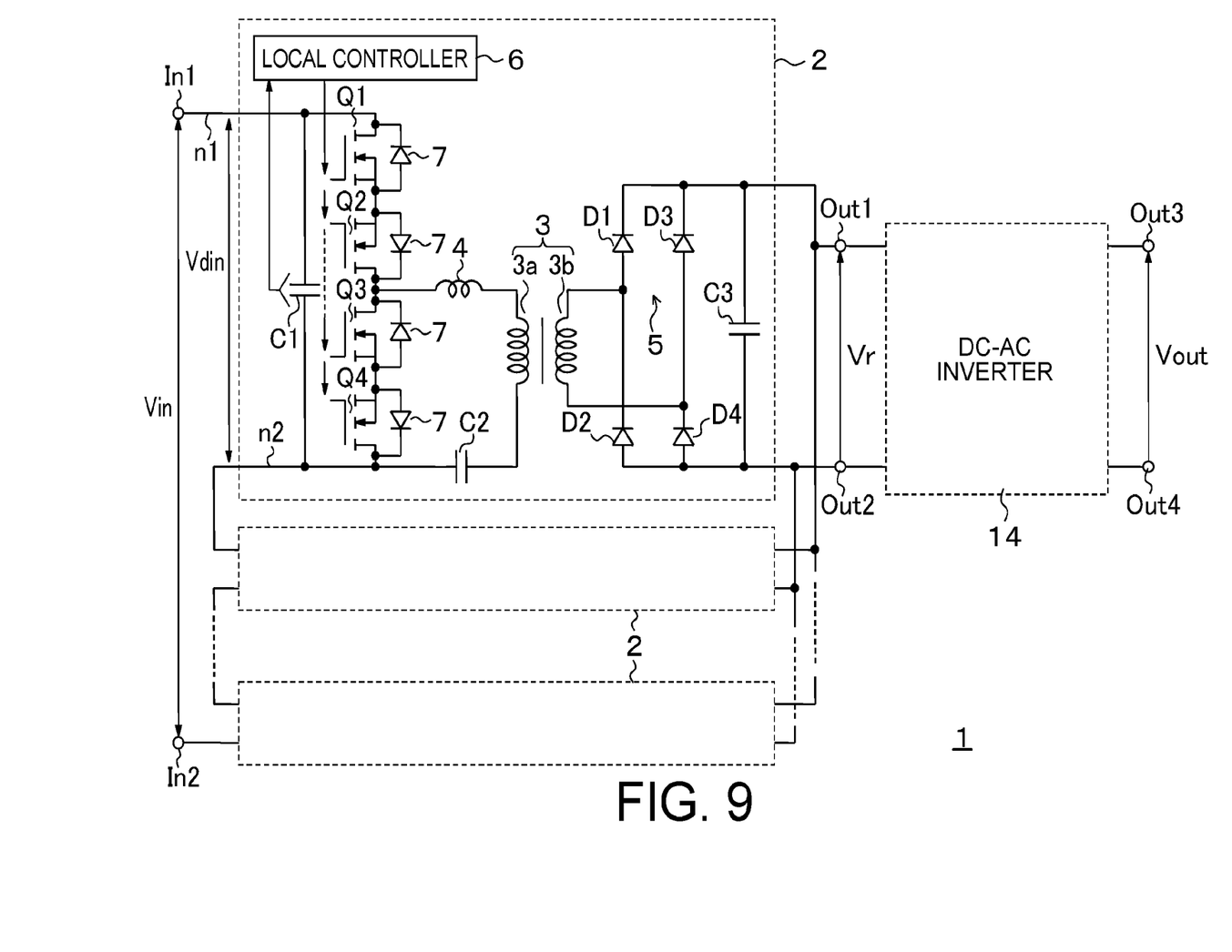
FIG. 9 is a view illustrating an example in which a DC-AC inverter is provided in the power conversion equipment.

Incidentally, the circuit connected to the first output terminal Out1 and the second output terminal Out2 in the power conversion equipment 1 of FIG. 1 is not necessarily limited to the DC-DC converter 10 illustrated in FIG. 8. For example, the DC-AC inverter may be connected as illustrated in FIG. 9. The power conversion equipment 1 of FIG. 9 combines the AC-DC converter 2 and the DC-AC inverter 14 to configure an AC-AC converter.

At least a part of the power conversion equipment 1 of FIG. 1, 8, or 9 can be configured by one or a plurality of semiconductors IC. For example, each AC-DC converter 2 may be configured by a separate semiconductor IC. In addition, the transformer 3 may be externally attached to the semiconductor IC or incorporated in the semiconductor IC. In the case of being incorporated, two facing semiconductor layers may be each formed to have a conductive pattern having a spiral shape to be coupled magnetically.

In this way, in the power conversion equipment 1 according to the first embodiment, the plurality of AC-DC converters 2 are series-connected between the first input terminal In1 and the second input terminal In2 to which the input voltage Vin is applied, the output terminal of each of the plurality of AC-DC converters 2 is configured to be connected in parallel with the first output terminal Out1 and the second output terminal Out2, and the local controller 6 is provided in each AC-DC converter 2 to control a timing of turning on or off the first to fourth transistors Q1 to Q4 in each AC-DC converter 2. However, the master controller is not provided which overall controls the plurality of AC-DC converters 2. The operation is performed which automatically balances the input voltage Vdin and the output current of each AC-DC converter 2 without the master controller. Thus, compared to the related art, the plurality of AC-DC converters can be operated stably with a simple control. In addition, compared to the related art, the number of components and the number of the wirings are reduced. Thus, it is possible to reduce a component cost and a consumption power and to realize miniaturization.

Second Embodiment

In a second embodiment, each AC-DC converter 2 is simplified further.

Figure 10:
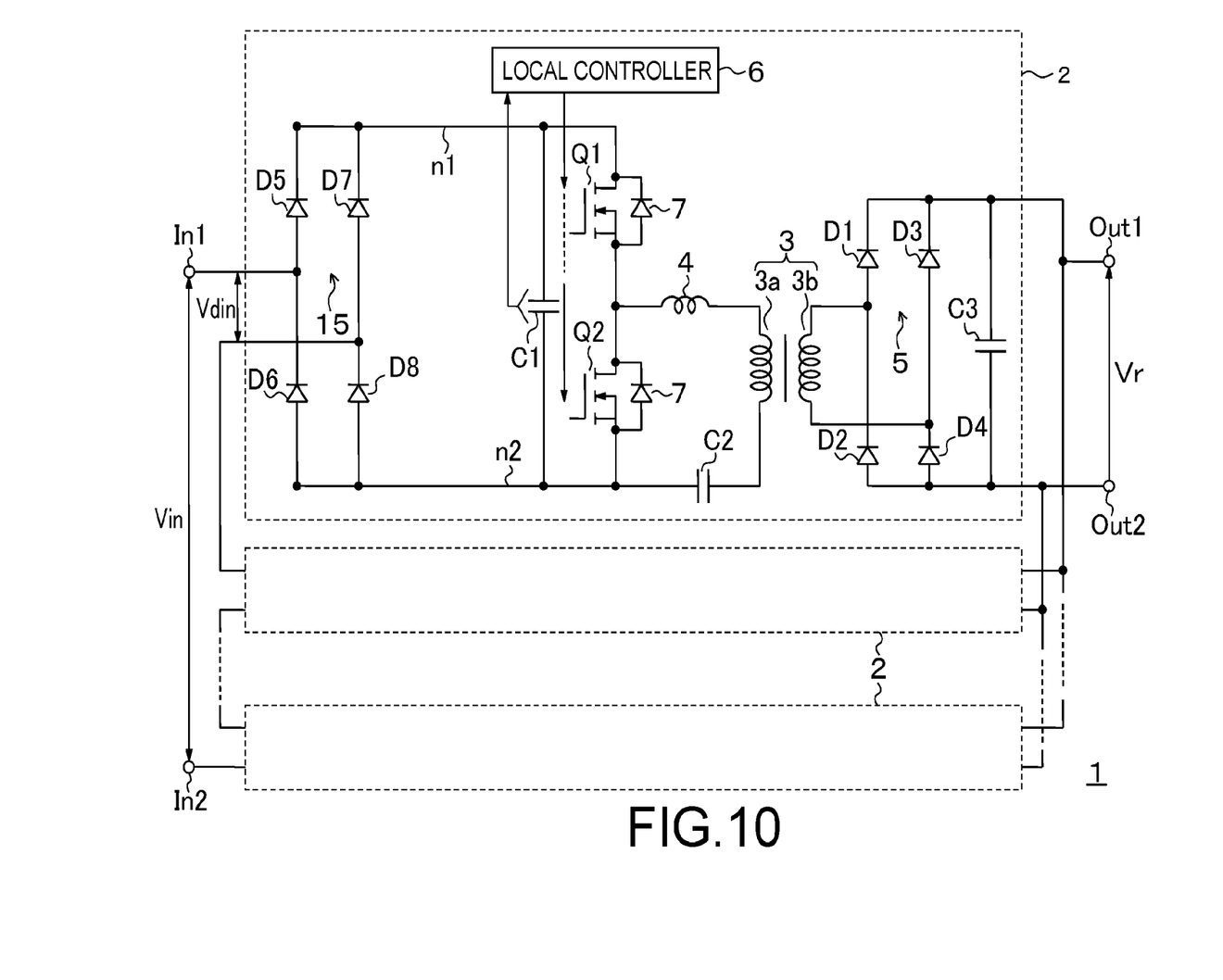
FIG. 10 is a circuit diagram of power conversion equipment according to a second embodiment.

FIG. 10 is a circuit diagram of the power conversion equipment 1 according to the second embodiment. Similarly with FIG. 1, in the power conversion equipment 1 of FIG. 10, the plurality of AC-DC converters 2 are series-connected between the first input terminal In1 and the second input terminal In2, and the output voltages of the AC-DC converters 2 are connected in parallel and output from the common first output terminal Out1 and second output terminal Out2. The internal configuration of each AC-DC converter 2 of FIG. 10 is different from the internal configuration of the AC-DC converter 2 of FIG. 1.

Each AC-DC converter 2 in FIG. 10 includes a diode bridge circuit 15, the first capacitor C1, the first transistor Q1, the second transistor Q2, the inductor 4, the second capacitor C2, the transformer 3, the diode bridge circuit 5, the third capacitor C3, and the local controller 6.

The divided input voltage Vdin is applied to the diode bridge circuit 15. The diode bridge circuit 15 including fifth to eighth diodes D5 to D8 converts the divided input voltage Vdin into the first full-wave rectified voltage. The first full-wave rectified voltage is applied to between the first node n1 and the second node n2. The first capacitor C1 is connected between the first node n1 and the second node n2, and the first transistor Q1 and the second transistor Q2 are cascode-connected. One end of the inductor 4 is connected to the connection path of the first transistor Q1 and the second transistor Q2. The connection relation of the inductor 4, the primary coil 3a of the transformer 3, and the second capacitor C2 is similar with that of FIG. 1. One end of the second capacitor C2 is connected to the source of the second transistor Q2.

In this way, each AC-DC converter 2 of FIG. 10 has the first and second transistors Q1 and Q2 of which the number is smaller than that of FIG. 1 by two. In the local controller 6 of FIG. 10, for example, a duty ratio is set to 50% (the duty ratio is 0.5), and the first transistor Q1 and the second transistor Q2 are alternately turned on. The local controller 6 may alternately turn on/off the first transistor Q1 and the second transistor Q2 regardless of the positive or negative polarity or the phase of the input voltage Vin. The local controller 6 of FIG. 1 turns on or off the first to fourth transistors Q1 to Q4 depending on whether the input voltage Vin has a positive polarity or a negative polarity. However, the local controller 6 of FIG. 10 can control the turning on/off of the first transistor Q1 and the second transistor Q2 with a simple control compared to the control of the local controller 6 of FIG. 1.

The local controller 6 performs the switching operation of repeatedly turning on and off the first transistor Q1 and the second transistor Q2 at a constant duty ratio (for example, 0.5). In a case where the divided input voltage Vdin has a positive polarity, while the first transistor Q1 is turned on, a current flows in a direction of the first node n1→the drain-source of the first transistor Q1→the inductor 4→the DC output circuit including the primary coil 3a and the secondary coil 3b of the transformer 3, the diode bridge 5, and the third capacitor C3→the second capacitor C2→the second node n2. In addition, while the second transistor Q2 is turned on, a current flows in a direction of the inductor 4→the drain-source of the second transistor Q2→the second capacitor C2→the DC output circuit including the primary coil 3a and the secondary coil 3b of the transformer 3, the diode bridge 5, and the third capacitor C3. The resonance circuit including the inductor 4 and the second capacitor C2 performs the resonance operation at a predetermined resonance frequency, and thus the first transistor Q1 and the second transistor Q2 perform the switching operation at a frequency equal to the resonance frequency determined by the inductance of the inductor 4 and the capacity of the second capacitor C2.

On the other hand, also in a case where the divided input voltage Vdin has a negative polarity, by a rectifying operation of the diode bridge circuit 15, each AC-DC converter 2 of FIG. 10 performs the same circuit operation as in a case where the divided input voltage Vdin has a positive polarity. While the first transistor Q1 is turned on, a current flows in a direction of the first node n1→the drain-source of the first transistor Q1→the inductor 4→the DC output circuit including the primary coil 3a and the secondary coil 3b, the diode bridge 5, and the third capacitor C3→the second capacitor C2→the second node n2. In addition, while the second transistor Q2 is turned on, a current flows in a direction of the second capacitor C2→the DC output circuit including the primary coil 3a and the secondary coil 3b of the transformer 3, the diode bridge 5, and the third capacitor C3→the inductor 4→the drain-source of the second transistor Q2.

In this way, in each AC-DC converter 2 according to the second embodiment, the diode bridge circuit 15 is newly added differently from the AC-DC converter 2 of FIG. 1. However, since two transistors for switching can be reduced, and it is not necessary to judge the polarity of the divided input voltage Vdin, the control of the local controller 6 can be simplified. Accordingly, the internal configuration of each AC-DC converter 2 can be simplified compared to FIG. 1, and it is possible to realize miniaturization and low power consumption and to reduce the component cost.

While certain embodiments have been described, these embodiments have been presented by way of example only, and are not intended to limit the scope of the inventions. Indeed, the novel methods and systems described herein may be embodied in a variety of other forms; furthermore, various omissions, substitutions and changes in the form of the methods and systems described herein may be made without departing from the spirit of the inventions. The accompanying claims and their equivalents are intended to cover such forms or modifications as would fall within the scope and spirit of the inventions.

The invention claimed is:

1. Power conversion equipment comprising:
    a first input terminal and a second input terminal to which an AC input voltage is applied;
    a plurality of AC-DC converters which are series-connected between the first input terminal and the second input terminal and each of which converts a divided input voltage obtained by dividing the input voltage into a half-sinusoidal full-wave rectified voltage in a state of being insulated electrically; and
    a first output terminal and a second output terminal through which the half-sinusoidal full-wave rectified voltages converted by the plurality of AC-DC converters are output commonly.

2. The power conversion equipment according to claim 1, wherein the plurality of AC-DC converters convert the divided input voltages into the half-sinusoidal full-wave rectified voltages in synchronization with a frequency of the input voltage.

3. The power conversion equipment according to claim 1, wherein each of the plurality of AC-DC converters comprises:
    a plurality of switching elements which are cascode-connected between a first node and a second node to which the divided input voltage is applied, and
    a control circuit which turns on or off the plurality of switching elements according to a polarity of the input voltage.

4. The power conversion equipment according to claim 3, wherein the plurality of AC-DC converters automatically balance the input voltage and an output voltage without a master controller which totally controls the plurality of AC-DC converters.

5. The power conversion equipment according to claim 3, wherein
the plurality of switching elements comprise first, second, third and fourth transistors cascode-connected between the first input terminal and the second input terminal, and
the control circuit controls gate voltages of the first to fourth transistors.

6. The power conversion equipment according to claim 5, wherein the control circuit switches on or off of the first to fourth transistors at a constant duty ratio.

7. The power conversion equipment according to claim 1, wherein each of the plurality of AC-DC converters comprises:
a diode bridge circuit which converts the divided input voltage into a divided full-wave rectified voltage,
a plurality of switching elements which are cascode-connected between a first node and a second node to which the divided full-wave rectified voltage is applied, and
a control circuit which turns on or off the plurality of switching elements at a predetermined duty ratio.

8. The power conversion equipment according to claim 7, wherein
the plurality of switching elements comprise first and second transistors cascode-connected between the first input terminal and the second input terminal, and
the control circuit controls gate voltages of the first and second transistors.

9. The power conversion equipment according to claim 8, wherein the control circuit turns on or off the first and second transistors at a constant duty ratio.

10. The power conversion equipment according to claim 9, wherein the control circuit turns on or off the first and second transistors at a constant duty ratio regardless of positive or negative polarity or the phase of the input voltage.

11. The power conversion equipment according to claim 1, wherein each of the plurality of AC-DC converters comprises:
a primary circuit which comprises a resonance circuit which resonates at a frequency faster than a frequency of the input voltage in synchronization with a frequency of the input voltage,
a secondary circuit which is electrically insulated from the primary circuit and outputs the half-sinusoidal full-wave rectified voltage, and
a transformer which performs a power conversion from the primary circuit to the secondary circuit in a state of being insulated electrically.

12. The power conversion equipment according to claim 1, further comprising:
a DC-DC converter which is connected to the first output terminal and the second output terminal and converts the half-sinusoidal full-wave rectified voltage into a DC voltage.

13. The power conversion equipment according to claim 1, further comprising:
a DC-AC inverter which is connected to the first output terminal and the second output terminal and converts the half-sinusoidal full-wave rectified voltage into an AC voltage.

14. Power conversion equipment comprising:
a first input terminal and a second input terminal to which an AC input voltage is applied;
a plurality of AC-DC converters which are series-connected between the first input terminal and the second input terminal and each of which converts a divided input voltage obtained by dividing the input voltage into a full-wave rectified voltage in a state of being insulated electrically; and
a first output terminal and a second output terminal through which the full-wave rectified voltages converted by the plurality of AC-DC converters are output commonly, wherein
each of the plurality of AC-DC converters comprises:
a plurality of switching elements which are cascode-connected between a first node and a second node to which the divided input voltage is applied, and
a control circuit which turns on or off the plurality of switching elements according to a polarity of the input voltage,
the plurality of AC-DC converters balance the input voltage and an output voltage without a master controller which totally controls the plurality of AC-DC converters, and
the control circuits turn on or off the plurality of switching elements so that the input voltage and an output current of the plurality of AC-DC converters are balanced.

* * * * *